United States Patent
Sridhara et al.

(10) Patent No.: US 9,578,049 B2
(45) Date of Patent: Feb. 21, 2017

(54) METHODS AND SYSTEMS FOR USING CAUSAL ANALYSIS FOR BOOSTED DECISION STUMPS TO IDENTIFY AND RESPOND TO NON-BENIGN BEHAVIORS

(71) Applicant: QUALCOMM Incorporated, San Diego, CA (US)

(72) Inventors: Vinay Sridhara, Santa Clara, CA (US); Yin Chen, Campbell, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 14/706,099

(22) Filed: May 7, 2015

(65) Prior Publication Data
US 2016/0330223 A1    Nov. 10, 2016

(51) Int. Cl.
*H04L 29/06* (2006.01)
*G06F 21/56* (2013.01)

(52) U.S. Cl.
CPC ........ *H04L 63/1425* (2013.01); *G06F 21/566* (2013.01)

(58) Field of Classification Search
CPC ............................ H04L 63/1425; G06F 21/566
USPC .......................................................... 726/23
See application file for complete search history.

(56) References Cited

U.S. PATENT DOCUMENTS

| | | | |
|---|---|---|---|
| 7,930,353 B2 * | 4/2011 | Chickering | ............. H04L 51/12 709/206 |
| 8,266,698 B1 | 9/2012 | Seshardi et al. | |
| 8,819,772 B2 | 8/2014 | Bettini et al. | |
| 8,938,508 B1 | 1/2015 | McCorkendale et al. | |
| 2010/0024037 A1 * | 1/2010 | Grzymala-Busse | G06F 21/6245 726/26 |
| 2012/0210423 A1 * | 8/2012 | Friedrichs | ........... H04L 63/1416 726/22 |
| 2012/0284791 A1 * | 11/2012 | Miller | ................... G06F 21/554 726/22 |

(Continued)

FOREIGN PATENT DOCUMENTS

WO    2013173000 A2    11/2013

OTHER PUBLICATIONS

International Search Report and Written Opinion—PCT/US2016/026328—ISA/EPO—Jun. 24, 2016.

*Primary Examiner* — Michael S McNally
(74) *Attorney, Agent, or Firm* — The Marbury Law Group, PLLC

(57) ABSTRACT

A computing device processor may be configured with processor-executable instructions to implement methods of detecting and responding non-benign behaviors of the computing device. The processor may be configured to monitor device behaviors to collect behavior information, generate a behavior vector information structure based on the collected behavior information, apply the behavior vector information structure to a classifier model to generate analysis results, use the analysis results to classify a behavior of the device, use the analysis results to determine the features evaluated by the classifier model that contributed most to the classification of the behavior, and select the top "n" (e.g., 3) features that contributed most to the classification of the behavior. The computing device may display the selected features on an electronic display of the computing device.

30 Claims, 8 Drawing Sheets

(56) References Cited

U.S. PATENT DOCUMENTS

2012/0317644 A1* 12/2012 Kumar .................. G06F 21/566
                                                                  726/24
2014/0181973 A1    6/2014  Lee et al.
2014/0188781 A1    7/2014  Fawaz et al.

* cited by examiner

METHODS AND SYSTEMS FOR USING CAUSAL ANALYSIS FOR BOOSTED DECISION STUMPS TO IDENTIFY AND RESPOND TO NON-BENIGN BEHAVIORS

BACKGROUND

Cellular and wireless communication technologies have seen explosive growth over the past several years. Wireless service providers now offer a wide array of features and services that provide their users with unprecedented levels of access to information, resources and communications. To keep pace with these enhancements, personal and consumer electronic devices (e.g., cellular phones, watches, headphones, remote controls, etc.) have become more powerful and complex than ever, and now commonly include powerful processors, large memories, and other resources that allow for executing complex and powerful software applications on their devices.

Due to these and other improvements, personal and consumer electronic devices are becoming ubiquitous in modern life, and have unprecedented levels of access to information that is generated by, or which relates to, their users. In addition, people frequently use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, personal and consumer electronic devices are quickly becoming the next frontier for malware and cyber attacks. Accordingly, new and improved security solutions that better protect resource-constrained computing devices, such as mobile and wireless devices, will be beneficial to consumers.

SUMMARY

The various aspects include methods of identifying, classifying, preventing and/or correcting conditions and behaviors that indicate anomalies or cause non-benign behaviors, as well as informing a user of such a computing device about the most significant contributors to or sources of such behavior or anomalies monitoring behaviors of a computing device to collect behavior information, which may include generating a behavior vector information structure based on the collected behavior information, applying the behavior vector information structure to a classifier model to generate analysis results, using the analysis results to classify a behavior of the computing device, using the analysis results to determine features evaluated by the classifier model that contributed most to the classification of the behavior, selecting the features that contributed most to the classification of the behavior, and displaying the selected features on an electronic display of the computing device.

In an aspect, using the analysis results to classify the behavior of the computing device may include using the analysis results to classify the behavior as an anomaly. In a further aspect, using the analysis results to classify the behavior of the computing device may include using the analysis results to classify the behavior as non-benign, using the analysis results to determine the features evaluated by the classifier model that contributed most to the classification of the behavior may include using the analysis results to determine the features evaluated by the classifier model that contributed most to the classification of the behavior as non-benign, and selecting the features that contributed most to the classification of the behavior may include selecting the features that contributed most to the classification of the behavior as non-benign.

In a further aspect, generating the behavior vector information structure based on the collected behavior information may include generating a behavior vector that characterizes an activity of a software application. In a further aspect, the method may include determining a relative importance of the features that contributed most to the classification of the behavior. In a further aspect, the method may include balancing tradeoffs between amounts of the computing device's processing, memory, and energy resources used to identify, analyze or respond to the behavior based on the features that contributed most to the classification of the behavior.

In a further aspect, applying the behavior vector information structure to the classifier model to generate the analysis results may include selecting a family of robust classifier models, and applying a plurality of behavior vectors to the selected family of robust classifier models to generate the analysis results. In a further aspect, the method may include receiving a full classifier model that includes a finite state machine, the finite state machine including information that is suitable for expression as a plurality of boosted decision stumps, each boosted decision stump including a test condition, a first weight value, and a second weight value, generating a list of boosted decision stumps by converting the finite state machine included in the full classifier model into the plurality of boosted decision stumps, and generating a lean classifier model in the computing device based on boosted decision stumps included in the list of boosted decision stumps, in which applying the behavior vector information structure to the classifier model to generate the analysis results includes applying the behavior vector information structure to the generated lean classifier model.

In a further aspect, applying the behavior vector information structure to the generated lean classifier model may include applying the collected behavior information included in the behavior vector information structure to each of the boosted decision stumps in the generated lean classifier model, using first weight values of the boosted decision stumps to compute a first weighted average of results of applying the collected behavior information to each of the boosted decision stumps in the generated lean classifier model, and comparing the first weighted average to a threshold value to determine whether the behavior is benign. In a further aspect, selecting the features that contributed most to the classification of the behavior includes using second weight values of the boosted decision stumps to determine the features that contributed most to the classification of the behavior as benign.

Further aspects include a computing device having a processor configured with processor-executable instructions to perform operations that include monitoring device behaviors to collect behavior information, generating a behavior vector information structure based on the collected behavior information, applying the behavior vector information structure to a classifier model to generate analysis results, using the analysis results to classify a behavior of the computing device, using the analysis results to determine features evaluated by the classifier model that contributed most to the classification of the behavior, selecting the features that contributed most to the classification of the behavior, and displaying the selected features on an electronic display of the computing device.

In an aspect, the processor may be configured with processor-executable instructions to perform operations such that using the analysis results to classify the behavior of the computing device includes using the analysis results to classify the behavior as an anomaly. In a further aspect, the processor may be configured with processor-executable instructions to perform operations such that using the analysis results to classify the behavior of the computing device includes using the analysis results to classify the behavior as non-benign, using the analysis results to determine the features evaluated by the classifier model that contributed most to the classification of the behavior includes using the analysis results to determine the features evaluated by the classifier model that contributed most to the classification of the behavior as non-benign, and selecting the features that contributed most to the classification of the behavior includes selecting the features that contributed most to the classification of the behavior as non-benign.

In a further aspect, the processor may be configured with processor-executable instructions to perform operations that further include determining a relative importance of the features that contributed most to the classification of the behavior. In a further aspect, the processor may be configured with processor-executable instructions to perform operations that further include balancing tradeoffs between amounts of the computing device's processing, memory, and energy resources used to identify, analyze or respond to the behavior based on the features that contributed most to the classification of the behavior.

In a further aspect, the processor may be configured with processor-executable instructions to perform operations that further include receiving a full classifier model that includes a finite state machine, the finite state machine including information that is suitable for expression as a plurality of boosted decision stumps, each boosted decision stump including a test condition, a first weight value, and a second weight value, generating a list of boosted decision stumps by converting the finite state machine included in the full classifier model into the plurality of boosted decision stumps, and generating a lean classifier model in the computing device based on boosted decision stumps included in the list of boosted decision stumps, and the processor may be configured with processor-executable instructions to perform operations such that applying the behavior vector information structure to the classifier model to generate the analysis results includes applying the collected behavior information included in the behavior vector information structure to each of the boosted decision stumps in the generated lean classifier model, using first weight values of the boosted decision stumps to compute a first weighted average of results of applying the collected behavior information to each of the boosted decision stumps in the generated lean classifier model, and comparing the first weighted average to a threshold value to determine whether the behavior is benign. In a further aspect, the processor may be configured with processor-executable instructions to perform operations such that selecting the features that contributed most to the classification of the behavior includes using second weight values of the boosted decision stumps to determine the features that contributed most to the classification of the behavior as benign.

Further aspects include a non-transitory computer readable storage medium having stored thereon processor-executable software instructions configured to cause a processor of a computing device to perform operations including monitoring device behaviors to collect behavior information, generating a behavior vector information structure based on the collected behavior information, applying the behavior vector information structure to a classifier model to generate analysis results, using the analysis results to classify a behavior of the computing device, using the analysis results to determine features evaluated by the classifier model that contributed most to the classification of the behavior, selecting the features that contributed most to the classification of the behavior, and displaying the selected features on an electronic display of the computing device.

In an aspect, the stored processor-executable software instructions may be configured to cause a processor to perform operations such that using the analysis results to classify the behavior of the computing device includes using the analysis results to classify the behavior as an anomaly. In a further aspect, the stored processor-executable software instructions may be configured to cause a processor to perform operations such that using the analysis results to classify the behavior of the computing device includes using the analysis results to classify the behavior as non-benign, using the analysis results to determine the features evaluated by the classifier model that contributed most to the classification of the behavior includes using the analysis results to determine the features evaluated by the classifier model that contributed most to the classification of the behavior as non-benign, and selecting the features that contributed most to the classification of the behavior includes selecting the features that contributed most to the classification of the behavior as non-benign.

In a further aspect, the stored processor-executable software instructions may be configured to cause a processor to perform operations that further include determining a relative importance of the features that contributed most to the classification of the behavior. In a further aspect, the stored processor-executable software instructions may be configured to cause a processor to perform operations that further include balancing tradeoffs between amounts of the computing device's processing, memory, and energy resources used to identify, analyze or respond to the behavior based on the features that contributed most to the classification of the behavior.

In a further aspect, the stored processor-executable software instructions may be configured to cause a processor to perform operations that further include receiving a full classifier model that includes a finite state machine, the finite state machine including information that is suitable for expression as a plurality of boosted decision stumps, each boosted decision stump including a test condition, a first weight value, and a second weight value, generating a list of boosted decision stumps by converting the finite state machine included in the full classifier model into the plurality of boosted decision stumps, and generating a lean classifier model in the computing device based on boosted decision stumps included in the list of boosted decision stumps, and the stored processor-executable software instructions may be configured to cause a processor to perform operations such that applying the behavior vector information structure to the classifier model to generate the analysis results includes applying the collected behavior information included in the behavior vector information structure to each of the boosted decision stumps in the generated lean classifier model, using first weight values of the boosted decision stumps to compute a first weighted average of results of applying the collected behavior information to each of the boosted decision stumps in the generated lean classifier model, and comparing the first weighted average to a threshold value to determine whether the behavior is benign.

In a further aspect, the stored processor-executable software instructions may be configured to cause a processor to perform operations such that selecting the features that contributed most to the classification of the behavior includes using second weight values of the boosted decision stumps to determine the features that contributed most to the classification of the behavior as benign.

Further aspects include a computing device that includes means for monitoring device behaviors to collect behavior information, means for generating a behavior vector information structure based on the collected behavior information, means for applying the behavior vector information structure to a classifier model to generate analysis results, means for using the analysis results to classify a behavior of the computing device, means for using the analysis results to determine features evaluated by the classifier model that contributed most to the classification of the behavior, means for selecting the features that contributed most to the classification of the behavior, and means for displaying the selected features.

In an aspect, means for using the analysis results to classify the behavior of the computing device may include means for using the analysis results to classify the behavior as an anomaly. In a further aspect, means for using the analysis results to classify the behavior of the computing device may include means for using the analysis results to classify the behavior as non-benign, means for using the analysis results to determine the features evaluated by the classifier model that contributed most to the classification of the behavior includes means for using the analysis results to determine the features evaluated by the classifier model that contributed most to the classification of the behavior as non-benign, and means for selecting the features that contributed most to the classification of the behavior includes means for selecting the features that contributed most to the classification of the behavior as non-benign. In a further aspect, the computing device may include means for determining a relative importance of the features that contributed most to the classification of the behavior.

In a further aspect, the computing device may include means for receiving a full classifier model that includes a finite state machine, the finite state machine including information that is suitable for expression as a plurality of boosted decision stumps, each boosted decision stump including a test condition, a first weight value, and a second weight value, means for generating a list of boosted decision stumps by converting the finite state machine included in the full classifier model into the plurality of boosted decision stumps, and means for generating a lean classifier model in the computing device based on boosted decision stumps included in the list of boosted decision stumps, in which means for applying the behavior vector information structure to the classifier model to generate the analysis results includes means for applying the collected behavior information included in the behavior vector information structure to each of the boosted decision stumps in the generated lean classifier model, means for using first weight values of the boosted decision stumps to compute a first weighted average of results of applying the collected behavior information to each of the boosted decision stumps in the generated lean classifier model, and means for comparing the first weighted average to a threshold value to determine whether the behavior is benign. In a further aspect, means for selecting the features that contributed most to the classification of the behavior includes means for using second weight values of the boosted decision stumps to determine the features that contributed most to the classification of the behavior as benign.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
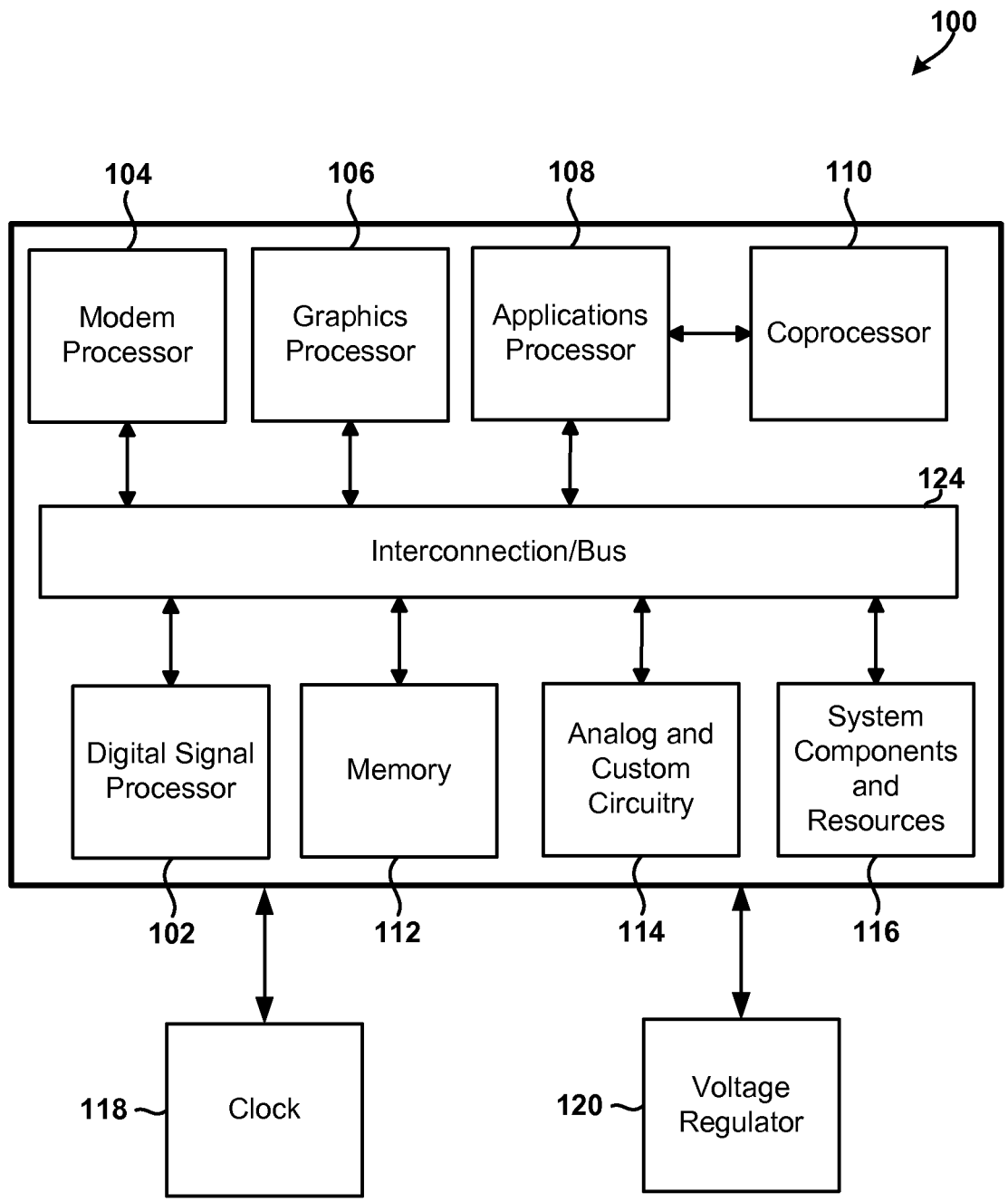
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various aspects include methods, and computing devices configured to implement the methods, of efficiently identifying, classifying, preventing and/or correcting conditions and behaviors that indicate anomalies or cause non-benign behavior, as well as informing a user of such a computing device about the most significant contributors to or sources of such behavior or anomalies. A computing device may be configured to monitor device behaviors to collect behavior information, generate a behavior vector information structure based on the collected behavior information, apply the behavior vector information structure to a classifier model to generate analysis results, use the analysis results to classify a behavior of the device (e.g., as benign or non-benign, as an anomaly, as malware, as gaming app, etc.), use the analysis results to determine the features evaluated by the classifier model that contributed most to the specific classification of the behavior, select the top "n" (e.g., 3) features that contributed most to the classification, and display the selected features on an electronic display of the computing device.

The various aspects improve the functioning of the computing device by allowing the device to more accurately and efficiently identify, prevent, correct, and/or otherwise respond to abnormal and non-benign software applications. In addition, the various aspects allow the computing device to present the user with more useful or meaningful information about a device behavior and/or provide the user with more control over how the device analyzes and responds to abnormal or non-benign behaviors. For example, if the system determines that a game that the user enjoys playing is non-benign (e.g., is contributing to the device's performance degradation over time, etc.), rather than automatically terminating the game, the system may allow the user to decide whether the negative characteristics the game outweigh the benefits of playing that game.

Additional improvements to the functions, functionalities, and/or functioning of computing devices will be evident from the detailed descriptions of the aspects provided below.

The term "performance degradation" is used in this application to refer to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, behaviors, activities, and conditions that degrade performance for any of these reasons are referred to herein as "not benign" or "non-benign." Behaviors, activities, and conditions that are not consistent with or deviate from the standard, normal, or expected operating patterns of the device may be referred to herein as "anomalies," or "abnormal behavior."

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Further, modern mobile devices are highly configurable and complex systems. As such, the features that are most important for determining whether a particular device behavior is benign, non-benign (e.g., malicious or performance-degrading), or an anomaly (e.g., inconsistent with the normal operating patterns of the device) may be different in each mobile device. In addition, there are a large variety of factors that may contribute to the degradation in performance and power utilization levels of a mobile computing device over time, including poorly written or designed software applications, malware, viruses, fragmented memory, background processes, etc. Due to the number, variety, and complexity of these factors, it is often not feasible to evaluate all of the factors that may contribute to the degradation in performance and/or power utilization levels of the complex yet resource-constrained systems of modern mobile computing devices. As such, it is difficult for users, operating systems, and/or application programs (e.g., anti-virus software, etc.) to accurately and efficiently identify the sources of problems. As a result, mobile device users currently have few remedies for preventing the degradation in performance and power utilization levels of a mobile device over time, or for restoring an aging mobile device to its original performance and power utilization levels.

To overcome the limitations of existing solutions, the various aspects include computing devices equipped with a behavioral monitoring and analysis system configured to quickly and efficiently identify non-benign software applications (e.g., applications that are malicious, poorly written, incompatible with the device, etc.), while informing a user about the most significant causes of or contributors to abnormal or non-benign behaviors. Identifying such behavior may enable a processor to prevent such applications from degrading the computing device's performance, power utilization levels, network usage levels, security, and/or privacy over time. Informing the user about the main causes of or contributors to detected abnormal or non-benign behavior may alert the user to the problem, inform the user about actions that may be taken to avoid such problems in the future, and/or enable the user to be involved in decisions regarding actions to be taken to mitigate or manage the non-benign behavior. The behavioral monitoring and analysis system may be configured to identify, prevent, and correct identified problems without having a significant, negative, or user perceivable impact on the responsiveness, performance, or power consumption characteristics of the computing device. In an aspect, the behavioral monitoring and analysis system may be a behavior-based security system.

The behavior-based monitoring and analysis system may include an observer process, daemon, module, or sub-system (herein collectively referred to as a "module") a behavior extractor module, and an analyzer module. The observer module may be configured to instrument or coordinate various application programming interfaces (APIs), registers, counters, or other device components (herein collectively "instrumented components") at various levels of the computing device system, collect behavior information from the instrumented components, and communicate (e.g., via a memory write operation, function call, etc.) the collected behavior information to the behavior extractor module. The behavior extractor module may use the collected behavior information to generate behavior vectors that each represent or characterize many or all of the observed events, conditions, tasks, activities, and/or behaviors (herein collectively "behaviors") associated with one or more specific threads, processes, software applications, modules, or components of the device. The behavior extractor module may communicate (e.g., via a memory write operation, function call, etc.) the generated behavior vectors to the analyzer module, which may apply the behavior vectors to classifier models to generate analysis results, and use the analysis results to determine whether a software application or device behavior is benign or non-benign (e.g., malicious, poorly written, performance-degrading, etc.). The device processor may then perform various operations to correct, heal, cure, isolate, or otherwise fix the identified problems (e.g., behaviors determined to be non-benign).

Each behavior vector may be an information structure that includes or encapsulates one or more "behavior features." A behavior feature may be a number or symbol that represents all or a portion of an observed event, condition, activity, operation, relationship, interaction, or behavior in the computing device. Each behavior feature may be associated with a data type that identifies a range of possible values, operations that may be performed on those values, the meanings of the values, and other similar information. The data type may be used by the computing device to determine how the corresponding behavior feature (or feature value) should be measured, analyzed, weighted, or used.

A classifier model may be a behavior model that includes data, entries, decision nodes, decision criteria, and/or information structures that may be used by a device processor to quickly and efficiently test or evaluate specific features, factors, data points, entries, APIs, states, conditions, behaviors, software applications, processes, operations, components, etc. (herein collectively "features") or other aspects of the device's behavior. A classifier model may also include information that may be used by a device processor to determine the nature of the relationships between software applications and/or the behaviors that to be monitored in the mobile device.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A local classifier model may be a lean classifier model that is generated in the computing device. A user-specific classifier model may be a local classifier model that includes a highly focused data model that includes or prioritizes decision nodes that test or evaluate device features/entries that are most relevant for determining whether a device behavior is consistent with the ordinary usage of the computing device by a specific user.

In an aspect, the full classifier model may be a finite state machine description or representation of the large corpus of behavior information. In an aspect, the finite state machine may include information that is suitable for expression as a plurality of nodes, boosted decision trees, or decision stumps that each test one or more features. For example, the finite state machine may be an information structure that may be expressed as a family of boosted decision stumps that collectively identify, describe, test, or evaluate all or many of the features and data points that are relevant to determining whether a computing device behavior is benign or contributing to that computing device's degradation in performance over time.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

For each answer (yes or no), a weight value may be added to classification values, such as to a benign value and a non-benign value (or to a benign value and an anomaly value, a benign value and malicious value, etc.). For example, if the value of the feature SendSMS exceeds 5, then a 0.9 weight is added to a malicious quantity (i.e., to a first classification value) and −0.9 is added to the benign quantity (i.e., to a second classification value). After all the features are tested, the malicious quantity may be compared to the benign quantity to determine whether the behavior is malicious or benign. For example, if the malicious quantity is 0.5 and the malicious quantity is −0.3, then the computing device could classify the behavior as malicious.

While the above-described behavior-based solution is generally very effective for classifying a behavior as benign, suspicious, or non-benign (with a confidence value), the system may not be able to adequately identify the specific reasons why a behavior was determined to be benign or non-benign. As a result, the system may not adequately inform the users of the computing device of the specific reasons that a particular behavior or software application is classified as benign or non-benign. Similarly, the system may not adequately balance tradeoffs between the amount of the device's limited processing, memory, or energy resources used to identify, analyze or respond to a non-benign behavior and the severity of the risk/threat posed by that behavior.

In the various aspects, the computing device may be configured to keep track of the features (e.g., binary decision trees) that contributed the most to an application being classified as benign or non-benign. In particular, the computing device may be configured keep track of the boosted decision stumps whose output contributed to a non-benign conclusion (or any other classification determination) and use the weights assigned to those boosted decision stumps to determine how much that each feature tested by one or more boosted decision stumps contributed to the classification of the behavior (e.g., determination that the behavior is non-benign, etc.). With such an accounting of boosted decision stump outcomes and weights, the computing device may select the top "n" (e.g., 3) features (or combination of features) that contributed most to the classification of the behavior, and present these features to the user. For example, the computing device could display a prompt that says:

Application X is not operating in a benign manner because:

1. It sent more than 5 SMS messages without user interaction (30%)

2. It attempted to upload your contacts to an unknown server (20%)

3. It captured location information from the GPS more than 15 times in 10 minutes (18%).

To accomplish this, in some aspects, the computing device may be configured to monitor its behaviors and collect behavior information (via the behavior observer module), generate a behavior vector information structure that characterizes the behavior (e.g., an activity of a software application, etc.) based on the collected behavior information (via the behavior extractor module), apply the behavior vector information structure to a classifier model to generate analysis results (via the behavior analyzer module), use the analysis results to classify one of the monitored or observed behaviors (e.g., as benign, as non-benign, as an anomaly, etc.), use the analysis results to determine the features that were evaluated by the classifier model (e.g., number of SMS messages sent without user interaction, etc.) that contributed most to the classification of the behavior, select the features that contributed most to the classification of the behavior, and display the selected features to the user (e.g., via an electronic display of the computing device, etc.).

In some aspects, the computing device may be configured to generate the classifier model locally in the device. For example, the computing device may be configured to receive a full classifier model that includes a finite state machine (or another information structure) that includes information the computing device may use to generate a plurality of boosted decision stumps that each include a test condition, a first weight value, and a second weight value. The computing device may generate the boosted decision stumps, prioritize the boosted decision stumps, and use all or a subset of the boosted decision stumps as the classifier model. For instance, the computing device may be configured to apply the collected behavior information included in the behavior vector information structure to each of the boosted decision stumps in the generated classifier model, use the first weight values of the boosted decision stumps to compute a first weighted average of results of applying the collected behavior information the boosted decision stumps, compare the first weighted average to a threshold value to determine whether the behavior is benign (or non-benign, an anomaly, etc.), and use the first and/or second weight values of the boosted decision stumps to determine the features that contributed most to the classification of the behavior.

The various aspects (including the aspects described with reference to FIGS. 2-7), may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 10).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components/resources 116, such as voltage regulators, oscillators, phase-locked loops, peripheral bridges, data controllers, memory controllers, system controllers, access ports, timers, and other similar components used to support the processors and clients running on a computing device.

The system components/resources 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components/resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2:
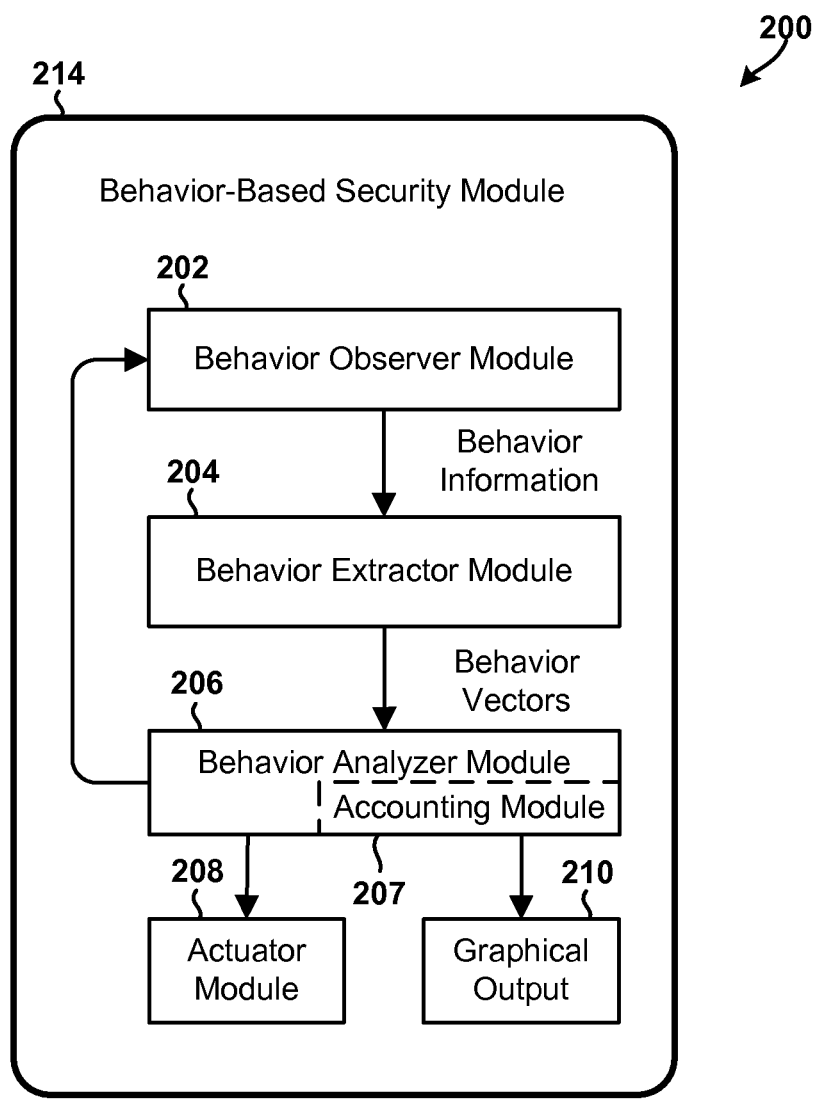
FIG. 2 is a block diagram illustrating example logical components and information flows in an aspect computing device configured to determine whether a particular mobile device behavior is benign or non-benign.

FIG. 2 illustrates example logical components and information flows in an aspect computing device that includes a behavior-based security module 214 configured to use behavioral analysis techniques to identify and respond to non-benign device behaviors. In the example illustrated in FIG. 2, the computing device is a mobile device 200 that includes a device processor (i.e., mobile device processor) configured with executable instruction modules that include a behavior observer module 202, a behavior extractor module 204, a behavior analyzer module 206, and an actuator module 208. Each of the modules 202-208 may be a thread, process, daemon, module, sub-system, or component that is implemented in software, hardware, or a combination thereof. In various aspects, the modules 202-208 may be implemented within parts of the operating system (e.g., within the kernel, in the kernel space, in the user space, etc.), within separate programs or applications, in specialized hardware buffers or processors, or any combination thereof. In an aspect, one or more of the modules 202-208 may be implemented as software instructions executing on one or more processors of the mobile device 200.

The behavior observer module 202 may be configured to instrument application programming interfaces (APIs), counters, hardware monitors, etc. at various levels/modules of the device, and monitor the activities, conditions, operations, and events (e.g., system events, state changes, etc.) at the various levels/modules over a period of time. The behavior observer module 202 may collect behavior information pertaining to the monitored activities, conditions, operations, or events, and store the collected information in a memory (e.g., in a log file, etc.).

In some aspects, the behavior observer module 202 may be configured to collect user-based information (e.g., user-persona information, etc.) from software applications operating in the computing device, the sensors of the computing device, and/or from the user's interactions with the computing device or its software applications. The user-based information may include any information that is suitable for identifying or characterizing the activities, device usage patterns, habits, moods, occupation, and/or emotional states of the device user. As examples, the user-based information may include information identifying the user's interactions with the device, number and types of customizations performed on the device, types of software applications downloaded or used by a user, the rate at which the user touches or interacts with the screen, the device's graphics processing unit (GPU) usage level, how often the user uses the device to communicate with others, the user's preferred method of communication (e.g., text vs. voice), how fast the user communicates, the device memory size, etc. The device processor may use the collected user-based information to learn how the user typically interacts with the computing device, to determine the normal operating patterns of the device and/or to determine whether an activity, task, or behavior should be associated with a UI event. For example, the device process may use the user-based information to determine whether the normal operating patterns of the device indicate that a specific activity is associated with a specific UI event and/or that the performance of a specific activity without its corresponding UI event is not consistent with the normal operating patterns of the device.

The behavior observer module 202 may be configured to collect the user-persona information by monitoring any of a variety of software applications (or software application types), including calendar applications, reminder applications, communication applications, financial applications, applications for accomplishing specific tasks (e.g., word processing, preparing tax reforms, presentation applications, accounting applications, etc.), location based applications (e.g., mapping and geolocation apps, etc.), social media applications, web browsers (e.g., to obtain information regarding past searches, browsing history, types of websites visited, content of websites visited, etc.), entertainment applications (e.g., an audio or multimedia player application), applications for accessing user accounts (e.g., banking apps, etc.), personal training and development applications, etc.

The behavior observer module 202 may also collect user-persona information by obtaining data from a heart rate monitor, blood pressure monitor, thermometer, pedometer, blood glucose meter, humidity sensor, breathalyzer, galvanic skin response sensor, or other sensor in the device. For example, the behavior observer module 202 may collect user-persona information by monitoring geo-spatial positioning and navigation systems of the device to determine user's current location (e.g., at the office, at home, at a restaurant, a gym, traveling, etc.), the user's current movements (e.g., is currently traveling, is exercising, is stationary, etc.), history of movements (e.g., travels extensively, never leaves town, etc.), whether the user is following his/her established routine (e.g., arrived to work on time, still at work) or is off his/her routine (e.g., arrived later than usual, left earlier than usual).

In some aspects, a device processor of the mobile device 200 may be configured to use the user-persona information and/or information characterizing the user's interaction with the device to generate the behavior vectors and/or classifier models. For example, the device processor may be configured to use user interaction information to dynamically determine the device features that are monitored, the behavior information that is included in the behavior vectors, the specific device features that are included in (and thus evaluated by) the classifier models, etc. As another example, the device processor may be configured to generate a classifier model that evaluates conditions/features focused on identifying the presence of UI events during the use or execution of certain types of software applications (e.g., games, etc.).

In some aspects, the device processor may be configured to determine whether the user-interaction information is relevant to analyzing all or portions of the collected behavior information, generate a classifier model that includes a decision node that evaluates a device feature in relation to a user-interaction (if relevant), generate a behavior vector that correlates the collected behavior information for which user-interaction is relevant, and apply the generated behavior vector to the generated classifier model to determine whether a device behavior is non-benign.

The behavior observer module 202 may also be configured to monitor the activities of the mobile device 200 by collecting information pertaining to library application programming interface (API) calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile device 200 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile device 200 by monitoring the system resource usage, which may include monitoring the number of forks, memory access operations, number of files open, etc. The behavior observer module 202 may monitor the state of the mobile device 200, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the mobile device 200 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile device 200.

The behavior observer module 202 may also monitor the activities of the mobile device 200 by monitoring one or more hardware counters that denote the state or status of the mobile device 200 and/or computing device sub-systems. A hardware counter may include a special-purpose register of the processors/cores that is configured to store a count value or state of hardware-related activities or events occurring in the mobile device 200.

The behavior observer module 202 may also monitor the activities of the mobile device 200 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile device 200 by monitoring transmissions or communications of the mobile device 200, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile device 200 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile device 200 by monitoring conditions or events at multiple levels of the mobile device 200, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile device 200 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device 200. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile device 200 is in a holster may be relevant to recognizing suspicious behaviors, for example, because activities and functions related to active usage by a user (e.g., taking photographs or videos, sending messages, conducting a voice call, recording sounds, etc.) occurring while the mobile device 200 is holstered could be signs of nefarious processes executing on the device (e.g., to track or spy on the user).

Other examples of sensor level observations related to usage or external environments may include, detecting near-field communication (NFC) signaling, collecting information from a credit card scanner, barcode scanner, or mobile tag reader, detecting the presence of a Universal Serial Bus (USB) power charging source, detecting that a keyboard or auxiliary device has been coupled to the mobile device 200, detecting that the mobile device 200 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device 200 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device 200, etc.

To reduce the number of factors monitored to a manageable level, in an aspect, the behavior observer module 202 may be configured to perform coarse observations by monitoring/observing an initial set of behaviors or factors that are a small subset of all factors that could contribute to the computing device's degradation. In an aspect, the behavior observer module 202 may receive the initial set of behaviors and/or factors from a server and/or a component in a cloud service or network. In an aspect, the initial set of behaviors/factors may be specified in machine learning classifier models.

The behavior observer module 202 may communicate (e.g., via a memory write operation, function call, etc.) the collected behavior information to the behavior extractor module 204. The behavior extractor module 204 may be configured to receive or retrieve the collected behavior information, and use this information to generate one or more behavior vectors. Each behavior vector may succinctly describe the behavior of the device, software application, or process in a value or vector data-structure. The vector data-structure may include series of numbers, each of which signifies a feature or a behavior of the mobile device, such as whether a camera of the mobile device is in use (e.g., as zero or one), how much network traffic has been transmitted from or generated by the mobile device (e.g., 20 KB/sec, etc.), how many Internet messages have been communicated (e.g., number of SMS messages, etc.), and/or any other behavior information collected by the behavior observer module 202. In an aspect, the behavior extractor module 204 may be configured to generate the behavior vectors so that they function as an identifier that enables the mobile device system (e.g., the behavior analyzer module 206) to quickly recognize, identify, or analyze a behavior of the device.

In an aspect, the behavior extractor module 204 may be configured to generate the behavior vectors to include information that may be input to a feature/decision node in the machine learning classifier to generate an answer to a query regarding a monitored activity or activities.

In an aspect, the behavior extractor module 204 may be configured to generate the behavior vectors to include execution information. The execution information may be included in the behavior vector as part of a behavior (e.g., camera used five times in three second by a background process, camera used three times in three second by a foreground process, etc.) or as part of an independent feature. In an aspect, the execution state information may be included in the behavior vector as a shadow feature value sub-vector or data structure. In an aspect, the behavior vector may store the shadow feature value sub-vector/data structure in association with the features, activities, tasks for which the execution state is relevant.

The behavior extractor module 204 may communicate (e.g., via a memory write operation, function call, etc.) the generated behavior vectors to the behavior analyzer module 206. The behavior analyzer module 206 may be configured to apply the behavior vectors to classifier modules to determine whether a device behavior is a non-benign behavior that is contributing to (or is likely to contribute to) the device's degradation over time and/or which may otherwise cause problems on the device. When a device behavior is classified as non-benign, the behavior and/or its classification may be used by an actuator module 208 to take an appropriate action.

In an aspect, the behavior analyzer module 206 may be configured, such as by including an accounting module, to keep track of the features that are contributing to a non-benign conclusion, and use that information to generate an output to the users, such as via a graphical output module 210, identifying the significant causes or contributors to the identified behavior.

Each classifier model may be a behavior model that includes data and/or information structures (e.g., feature vectors, behavior vectors, component lists, etc.) that may be used by a computing device processor to evaluate a specific feature or aspect of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign. As an example, a device processor may be may be configured to receive a full classifier model from a network server, generate a lean classifier model in the mobile device based on the full classifier, and use the locally generated lean classifier model to classify a behavior of the device as being either benign or non-benign (i.e., malicious, performance degrading, etc.).

A locally generated lean classifier model is a lean classifier model that is generated in the computing device. That is, since mobile devices are highly configurable and complex systems, the features that are most important for determining whether a particular device behavior is non-benign (e.g., malicious or performance-degrading) may be different in each device. Further, a different combination of features may require monitoring and/or analysis in each device in order for that device to quickly and efficiently determine whether a particular behavior is non-benign. Yet, the precise combination of features that require monitoring and analysis, and the relative priority or importance of each feature or feature combination, can often only be determined using information obtained from the specific device in which the behavior is to be monitored or analyzed. For these and other reasons, various aspects may generate classifier models in the mobile device in which the models are used. These local classifier models allow the device processor to accurately identify the specific features that are most important in determining whether a behavior on that specific device is non-benign (e.g., contributing to that device's degradation in performance). The local classifier models also allow the device processor to prioritize the features that are tested or evaluated in accordance with their relative importance to classifying a behavior in that specific device.

A device-specific classifier model is a classifier model that includes a focused data model that includes/tests only computing device-specific features/entries that are determined to be most relevant to classifying an activity or behavior in a specific computing device.

An application-specific classifier model is a classifier model that includes a focused data model that includes/tests only the features/entries that are most relevant for evaluating a particular software application.

A user-specific classifier model may be a local classifier model that includes a focused data model that includes or prioritizes tests on the features/entries that are most relevant for identifying a user of the device, determining the persona of the user, determining whether a device behavior is consistent with the persona of an identified user, determining whether a device behavior is consistent with the ordinary usage of that device by one of its identified users, or for determining whether a user's activities are indicative of a non-benign device behavior.

By dynamically generating user-specific, device-specific, and/or application-specific classifier models locally in the mobile device, the various aspects allow the device processor to focus its monitoring and analysis operations on a small number of features that are most important for determining whether the operations of that specific mobile device and/or of a specific software application operating in that device are consistent with the personality, habits, or ordinary usage patterns of a known user of that specific device.

In an aspect, the behavior analyzer module 206 may be configured to classify a behavior as "suspicious" when the results of its behavioral analysis operations do not provide sufficient information to classify a device behavior as either benign or non-benign, and keep track of the features contributing to this classification (e.g., in an accounting module 207). The behavior analyzer module 206 may be configured to notify the behavior observer module 202 in response to determining that a device behavior is suspicious. In response, the behavior observer module 202 may adjust the granularity of its observations (i.e., the level of detail at which computing device features are monitored) and/or change the factors or behaviors that are monitored based on information received from the behavior analyzer module 206 (e.g., results of the real-time analysis operations), generate or collect new or additional behavior information, and send the new/additional information to the behavior analyzer module 206 for further analysis/classification. Such feedback communications between the behavior observer module 202 and the behavior analyzer module 206 enable the mobile device 200 to recursively increase the granularity of the observations (i.e., make finer or more detailed observations) or change the features/behaviors that are observed until a collective behavior is classified as benign or non-benign, a source of a suspicious or performance-degrading behavior is identified, until a processing or battery consumption threshold is reached, or until the device processor determines that the source of the suspicious or performance-degrading device behavior cannot be identified from further changes, adjustments, or increases in observation granularity. Such feedback communication also enable the mobile device 200 to adjust or modify the behavior vectors and classifier models without consuming an excessive amount of the computing device's processing, memory, or energy resources.

In an aspect, the behavior analyzer module 206 may be configured to receive and analyze information collected by various mobile device sub-systems and/or over various time periods to learn the normal operational behaviors of the mobile device under a variety of contexts and conditions, and generate models of normal mobile device behaviors (e.g., in the form of classifier models, etc.) under the various contexts/conditions. In an aspect, the behavior analyzer module 206 may be configured to correlate the collected behavior information or behavior vectors against the generated behavior models, and perform behavior analysis operations based on the correlations to determine whether the received observations conflict with (or do not match) the learned normal operational behaviors.

As a high-level example, the mobile device 200 might detect (via the collected behavior information) that a camera has been used, that the mobile device 200 is attempting to upload the picture to a server, and that an application on the mobile device took the picture while the device was holstered and attached to the user's belt. The mobile device 200 may determine whether this detected behavior (e.g., usage of the camera while holstered) is a behavior that is acceptable or common to the user. This may be achieved by comparing the detected behavior (e.g., the generated behavior vector) with past behaviors of the mobile device 200 or user. Since taking pictures and uploading them to a server while holstered is an unusual behavior (as may be determined from observed normal behaviors in the context of being holstered), in this situation the computing device may recognize this as being inconsistent with a pattern of ordinary usage of the computing device by the user, and initiate an appropriate response (e.g., shutting off the camera, sounding an alarm, etc.).

In the various aspects, the mobile device 200 may be configured to work in conjunction with a network server to intelligently and efficiently identify the features, factors, and data points that are most relevant to determining whether an activity or behavior is non-benign. For example, the device processor may be configured to receive a full classifier model from the network server, and use the received full classifier model to generate lean classifier models (i.e., data/behavior models) that are specific for the users of the device and/or to the features and functionalities of the device or its software applications. The device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the classifier model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the device processor can strike a balance between efficiency and accuracy by limiting the use of the most complete, but resource-intensive lean classifier models to those situations where a robust classifier model is needed to definitively classify a behavior.

In various aspects, the device processor may be configured to generate lean classifier models by converting a finite state machine representation or expression included in a full classifier model into boosted decision stumps. The device processor may prune or cull the full set of boosted decision stumps based on the user-persona information or user-specific device features to generate a lean classifier model that includes a subset of boosted decision stumps included in the full classifier model. The device processor may then use the lean classifier model to intelligently monitor, analyze and/or classify a device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions). Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

In an aspect, the behavior analyzer module 206 may include a mechanism, such as an accounting module 207, to keep track of the boosted decision stumps whose output contributes to a non-benign behavior classification. The accounting module 207 or the behavior analyzer module 206 may also keep track of the weights assigned to boosted decision stumps whose output contributes to a non-benign behavior classification so that a weighted contribution can be calculated.

In an aspect, the accounting module 207 or the behavior analyzer module 206 may group boosted decision stumps whose output contributes to a non-benign behavior classification by category or related features in order to provide a higher level perspective on the causes of or contributors to a non-benign behavior classification. A particular computing device functionality or component may be monitored with a number of behavior vector entries. For example, the display may be monitored by vector values and analyzed by boosted decision stumps associated with on/off state, brightness, still/video, etc. As another example, communications (e.g., modem use or data transmissions) may be monitored by vector values and analyzed by boosted decision stumps associated with on/off state, number of transmissions within last second, number of transmission within last minute, number of transmissions within last two minutes, average size of data transmissions, ratio of outgoing data to incoming data, etc. By tracking the boosted decision stumps (and their associated weights) whose output contributes to a non-benign behavior classification by group or association, a processor can identify a functionality or component contributing to that classification that is monitored with multiple behavior vector elements.

Figure 3:
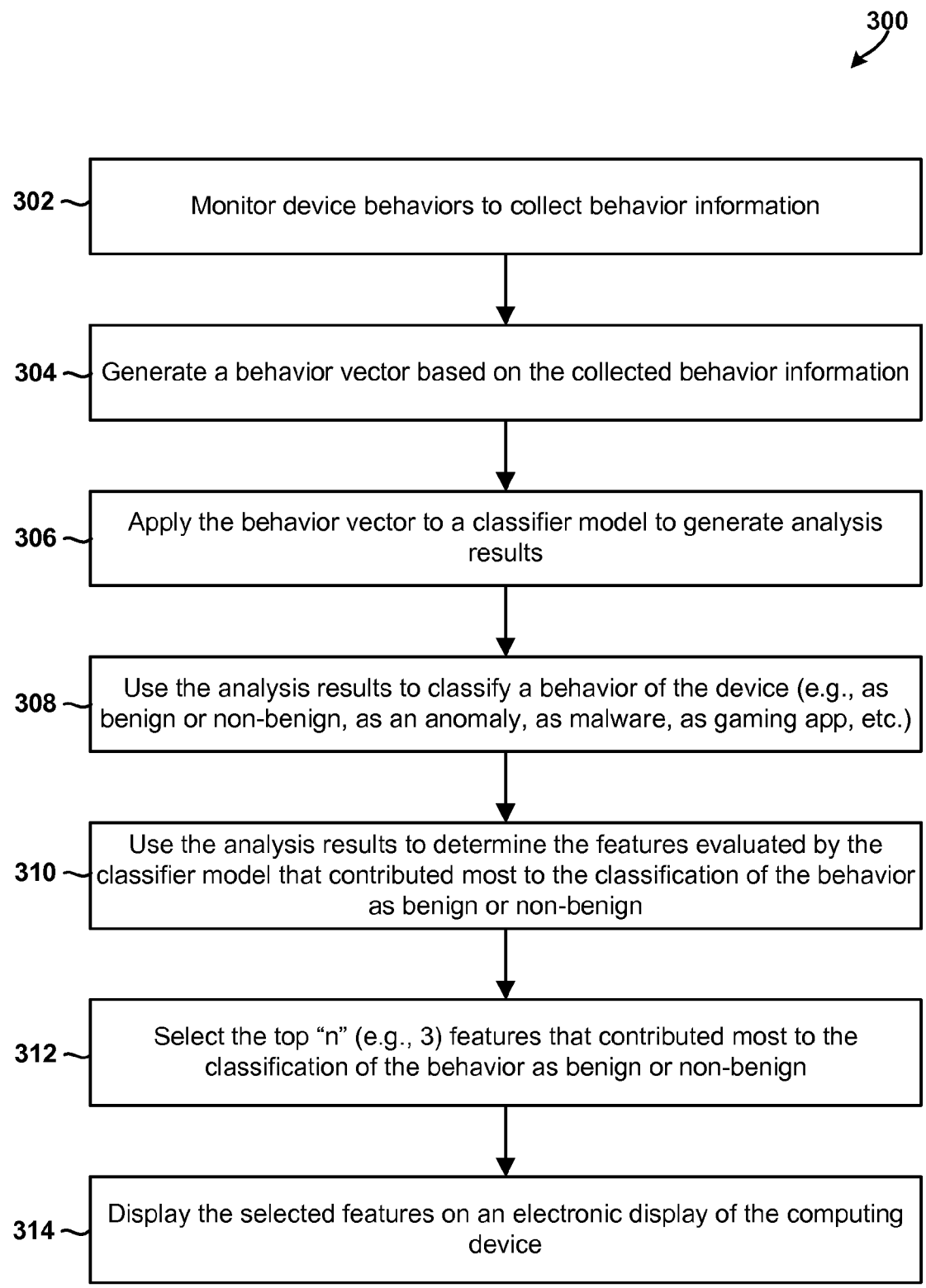
FIG. 3 is a process flow diagram illustrating a method of determining the features that contributed most to a classification of a behavior as benign or non-benign in accordance with an aspect.

FIG. 3 illustrates a method 300 of determining the features that contributed most to the classification of the behavior as benign or non-benign in accordance with an aspect. Method 300 may be performed by a device processor of a mobile or resource constrained computing device. In block 302, the device processor may monitor device behaviors to collect behavior information. In block 304, the device processor may generate a behavior vector based on the collected behavior information. In block 306, the device processor may apply the behavior vector to a classifier model to generate analysis results. In block 308, the device processor may use the analysis results to classify a behavior of the device as benign or non-benign.

In block 310, the device processor may use the analysis results to determine the features evaluated by the classifier model that contributed most to the classification of the behavior as benign or non-benign. As noted above, this may involve keeping track of the boosted decision stumps whose output contributes to a non-benign behavior classification, and their assigned weights. Further, this may involve identifying those boosted decision stumps whose output contributes to a non-benign behavior classification that are related to a common feature, functionality or component. In block 312, the device processor may select the top "n" (e.g., 3) features, functionalities and/or components that contributed most to the classification of the behavior as benign or non-benign. In block 314, the device processor may display the selected features on an electronic display of the computing device.

Figure 4:
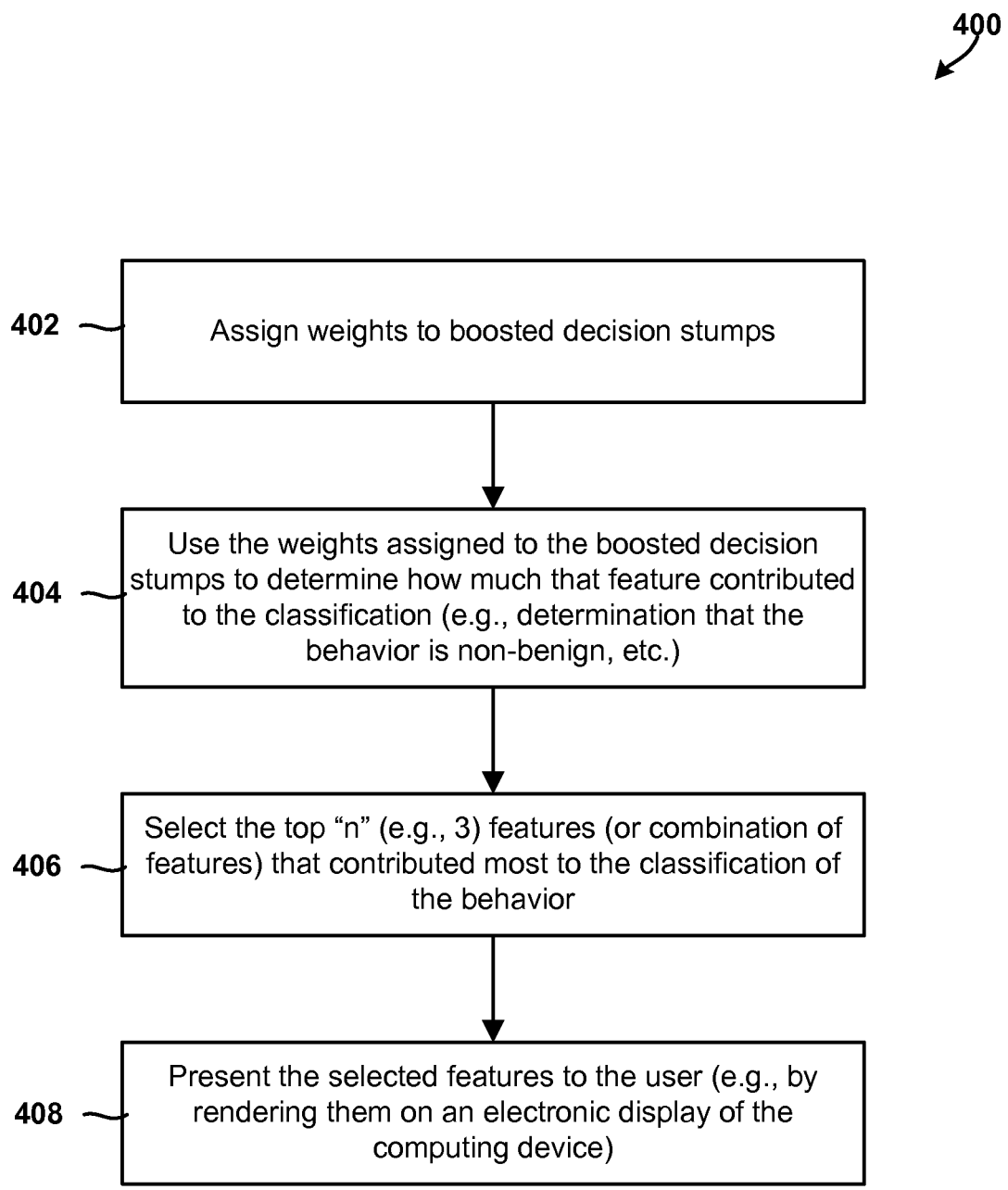
FIG. 4 is a process flow diagram illustrating a method of determining the features that contributed most to a classification of a behavior as benign or non-benign in accordance with another aspect.

FIG. 4 illustrates a method 400 of determining the features that contributed most to the classification of the behavior as benign or non-benign in accordance with another aspect. The method 400 may be performed by a device processor of a mobile or resource constrained computing device. In block 402, the device processor may assign weights to boosted decision stumps, or access weights assigned to boosted decision stumps by another process or as part of an instantiation of a classification model.

In block 404, the device processor may use the weights assigned to the boosted decision stumps to determine how much that feature contributed to the determination that the behavior is non-benign. In an aspect, this operation in block 404 may involve identifying those boosted decision stumps whose output contributes to a non-benign behavior classification that are related to a common feature, functionality or component.

In block 406, the device processor may select the top "n" (e.g., 4) features, functionalities, and/or components (or combinations thereof) that contributed most to the classification of the behavior. In block 408, the device processor may present the selected features to the user (e.g., by rendering them on an electronic display of the computing device).

Figure 5:
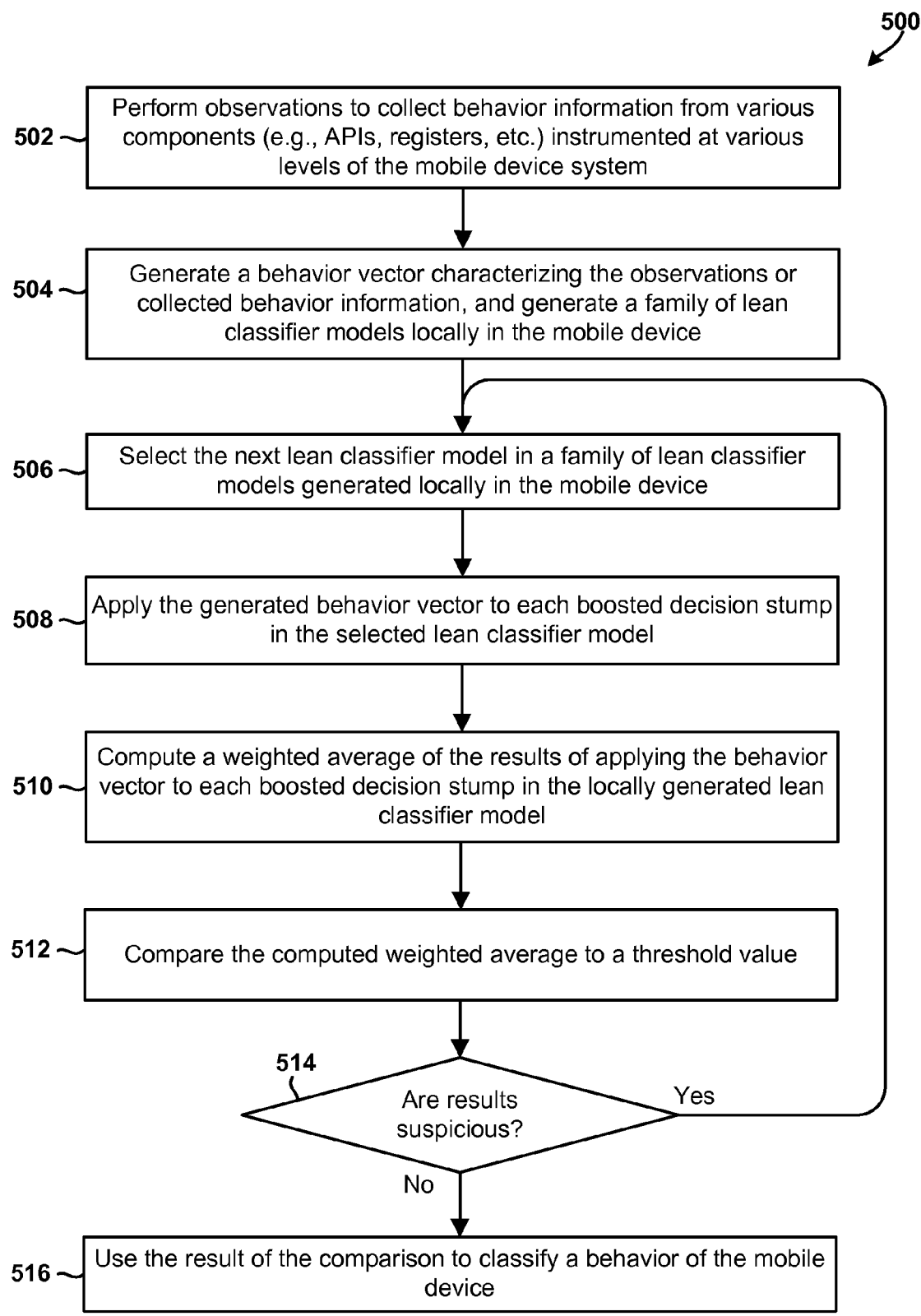
FIG. 5 is a process flow diagram illustrating a method of using a family of classifier models to classify a device behavior in accordance with an aspect.

FIG. 5 illustrates an aspect method 500 of using a family of lean classifier model to classify a device behavior in the computing device. Method 500 may be performed by a device processor of a mobile or resource constrained computing device that is configured with processor-executable instructions to perform the operations of the method.

In block 502, the device processor my perform observations to collect behavior information from various components that are instrumented at various levels of the mobile device system. In an aspect, this may be accomplished via the behavior observer module 302 discussed above with reference to FIG. 3. In block 504, the device processor may generate a behavior vector characterizing the collected behavior information and/or a mobile device behavior. Also in block 504, the device processor may use a full classifier model received from a network server to generate a lean classifier model or a family of lean classifier models of varying levels of complexity (or "leanness"). To accomplish this, the device processor may cull a family of boosted decision stumps included in the full classifier model to generate lean classifier models that include a reduced number of boosted decision stumps and/or evaluate a limited number of test conditions. In an aspect, one or more of the lean classifier models may be user-specific classifier models.

In block 506, the device processor may select the leanest classifier in the family of lean classifier models (i.e., the model based on the fewest number of different mobile device states, features, behaviors, or conditions) that has not yet been evaluated or applied by the mobile device. In an aspect, this may be accomplished by the device processor selecting the first classifier model in an ordered list of classifier models. In block 508, the device processor may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector may be truncated or filtered to just include the limited number of test condition parameters included in the lean classifier model, thereby further reducing the computational effort in applying the model.

In block 510, the device processor may compute or determine a weighted average of the results of applying the collected behavior information to each boosted decision stump in the lean classifier model. In block 512, the device processor may compare the computed weighted average to a threshold value. In determination block 514, the device processor may determine whether the results of this comparison and/or the results generated by applying the selected lean classifier model are suspicious. For example, the device processor may determine whether these results may be used to classify a behavior as either malicious or benign with a high degree of confidence, and if not treat the behavior as suspicious.

If the device processor determines that the results are suspicious (e.g., determination block 514="Yes"), the device processor may repeat the operations in blocks 506-512 to select and apply a stronger (i.e., less lean) classifier model that evaluates more device states, features, behaviors, or conditions until the behavior is classified as malicious or benign with a high degree of confidence. If the device processor determines that the results are not suspicious (e.g., determination block 514="No"), such as by determining that the behavior can be classified as either malicious or benign with a high degree of confidence, in block 516, the device processor may use the result of the comparison generated in block 512 to classify a behavior of the mobile device as benign or potentially malicious.

In an alternative aspect method, the operations described above may be accomplished by sequentially selecting a boosted decision stump that is not already in the lean classifier model; identifying all other boosted decision stumps that depend upon the same mobile device state, feature, behavior, or condition as the selected decision stump (and thus can be applied based upon one determination result); including in the lean classifier model the selected and all identified other boosted decision stumps that that depend upon the same mobile device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Figure 6:
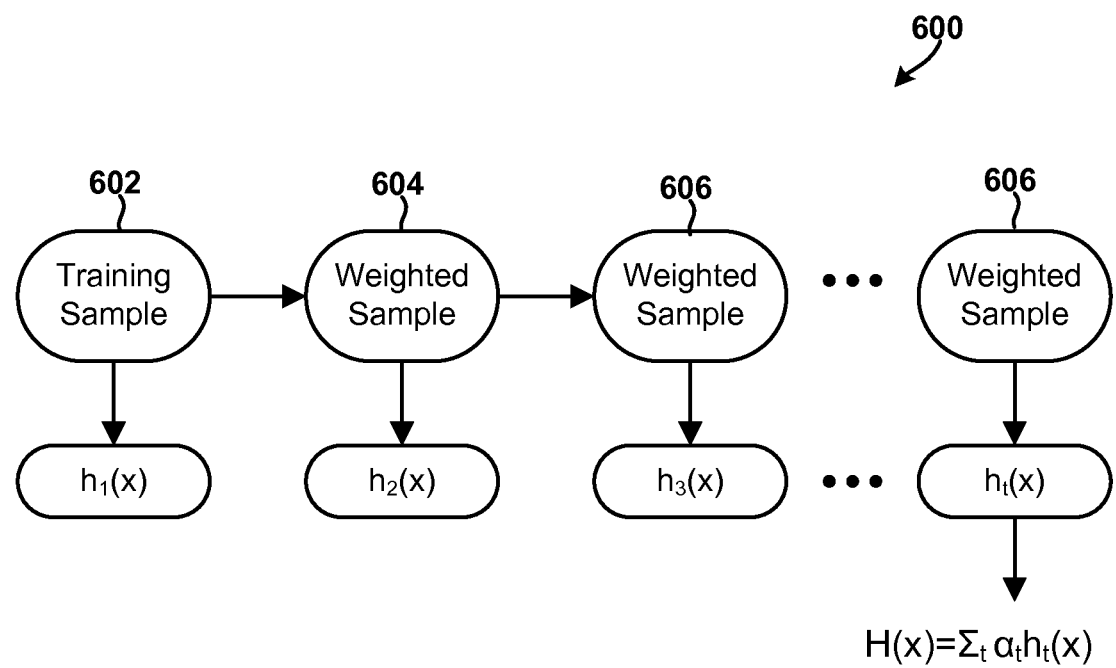
FIG. 6 is an illustration of example decision nodes that may be generated and used to generate classifier models.

FIG. 6 illustrates an example method 600 suitable for generating a decision tree/classifier that is suitable for use in accordance with various aspects. Method 600 may be performed by a device processor of a mobile or resource constrained computing device that is configured with processor-executable instructions to perform the operations of the method. In block 602, the device processor may generate and/or execute a decision tree/classifier, collect a training sample from the execution of the decision tree/classifier, and generate a new classifier model (h1(x)) based on the training sample. The training sample may include information collected from previous observations or analysis of mobile device behaviors, software applications, or processes in the mobile device. The training sample and/or new classifier model (h1(x)) may be generated based the types of question or test conditions included in previous classifiers and/or based on accuracy or performance characteristics collected from the execution/application of previous data/behavior models or classifiers.

In block 604, the device processor may boost (or increase) the weight of the entries that were misclassified by the generated decision tree/classifier (h1(x)) to generate a second new tree/classifier (h2(x)). In an aspect, the training sample and/or new classifier model (h2(x)) may be generated based on the mistake rate of a previous execution or use (h1(x)) of a classifier. In an aspect, the training sample and/or new classifier model (h2(x)) may be generated based on attributes determined to have that contributed to the mistake rate or the misclassification of data points in the previous execution or use of a classifier.

In an aspect, the misclassified entries may be weighted based on their relatively accuracy or effectiveness. In operation 606, the processor may boost (or increase) the weight of the entries that were misclassified by the generated second tree/classifier (h2(x)) to generate a third new tree/classifier (h3(x)). In operation 608, the operations of 604-606 may be repeated to generate "t" number of new tree/classifiers ($h_t(x)$).

By boosting or increasing the weight of the entries that were misclassified by the first decision tree/classifier (h1 (x)), the second tree/classifier (h2(x)) may more accurately classify the entities that were misclassified by the first decision tree/classifier (h1(x)), but may also misclassify some of the entities that where correctly classified by the first decision tree/classifier (h1(x)). Similarly, the third tree/classifier (h3(x)) may more accurately classify the entities that were misclassified by the second decision tree/classifier (h2(x)) and misclassify some of the entities that where correctly classified by the second decision tree/classifier (h2(x)). That is, generating the family of tree/classifiers h1(x)-$h_t$(x) may not result in a system that converges as a whole, but results in a number of decision trees/classifiers that may be executed in parallel.

Figure 7:
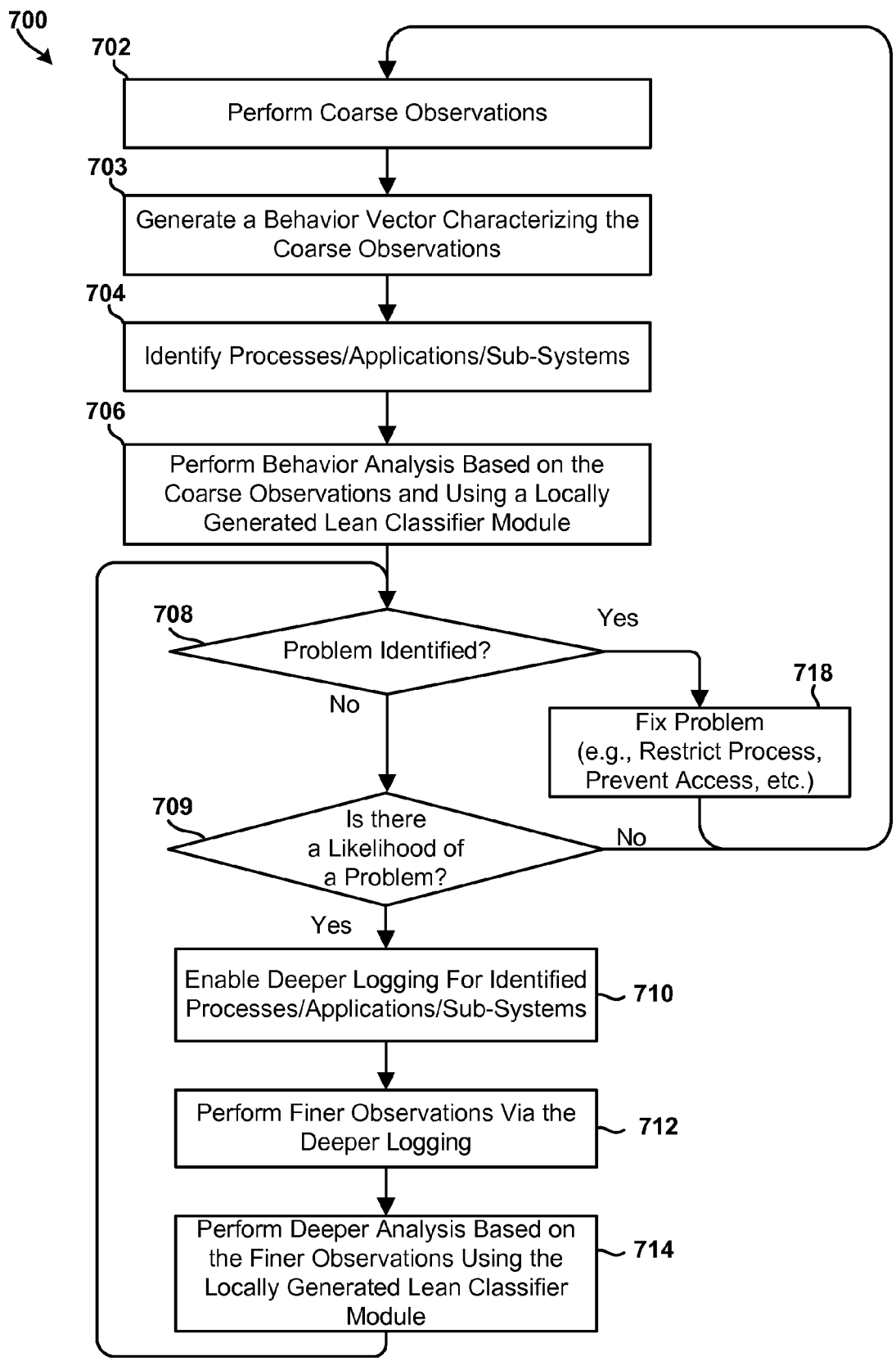
FIG. 7 is a process flow diagram illustrating a method of performing adaptive observations in accordance with an aspect.

FIG. 7 illustrates an example method 700 for performing dynamic and adaptive observations in accordance with an aspect. Method 700 may be performed by a device processor of a mobile or resource constrained computing device that is configured with processor-executable instructions to perform the operations of the method. In block 702, the device processor may perform coarse observations by monitoring/observing a subset of a large number of factors, behaviors, and activities that could contribute to the mobile device's degradation. In block 703, the device processor may generate a behavior vector characterizing the coarse observations and/or the mobile device behavior based on the coarse observations. In block 704, the device processor may identify subsystems, processes, and/or applications associated with the coarse observations that may potentially contribute to the mobile device's degradation. This may be achieved, for example, by comparing information received from multiple sources with contextual information received from sensors of the mobile device. In block 706, the device processor may perform behavioral analysis operations based on the coarse observations.

In determination block 708, the device processor may determine whether suspicious behaviors or potential problems can be identified and corrected based on the results of the behavioral analysis. When the device processor determines that the suspicious behaviors or potential problems can be identified and corrected based on the results of the behavioral analysis (i.e., determination block 708="Yes"), in block 718, the processor may initiate a process to correct the behavior and return to block 702 to perform additional coarse observations.

When the device processor determines that the suspicious behaviors or potential problems cannot be identified and/or corrected based on the results of the behavioral analysis (i.e., determination block 708="No"), in determination block 709 the device processor may determine whether there is a likelihood of a problem. In an aspect, the device processor may determine that there is a likelihood of a problem by computing a probability of the mobile device encountering potential problems and/or engaging in suspicious behaviors, and determining whether the computed probability is greater than a predetermined threshold. When the device processor determines that the computed probability is not greater than the predetermined threshold and/or there is not a likelihood that suspicious behaviors or potential problems exist and/or are detectable (i.e., determination block 709="No"), the processor may return to block 702 to perform additional coarse observations.

When the device processor determines that there is a likelihood that suspicious behaviors or potential problems exist and/or are detectable (i.e., determination block 709="Yes"), in block 710, the device processor may perform deeper logging/observations or final logging on the identified subsystems, processes or applications. In block 712, the device processor may perform deeper and more detailed observations on the identified subsystems, processes or applications. In block 714, the device processor may perform further and/or deeper behavioral analysis based on the deeper and more detailed observations. In determination block 708, the device processor may again determine whether the suspicious behaviors or potential problems can be identified and corrected based on the results of the deeper behavioral analysis. When the device processor determines that the suspicious behaviors or potential problems cannot be identified and corrected based on the results of the deeper behavioral analysis (i.e., determination block 708="No"), the processor may repeat the operations in blocks 710-714 until the level of detail is fine enough to identify the problem or until it is determined that the problem cannot be identified with additional detail or that no problem exists.

When the device processor determines that the suspicious behaviors or potential problems can be identified and corrected based on the results of the deeper behavioral analysis (i.e., determination block 708="Yes"), in block 718, the device processor may perform operations to correct the problem/behavior, and the processor may return to block 702 to perform additional operations.

In an aspect, as part of blocks 702-718 of method 700, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

The various aspects improve upon existing solutions by using behavior analysis and/or machine learning techniques (as opposed to a permissions, policy, or rules-based approaches) to monitor and analyze the collective behavior of a select group of software applications. The use of behavior analysis or machine learning techniques is important because modern computing devices are highly configurable and complex systems, and the factors that are most important for determining whether software applications are colluding may be different in each device. Further, different combinations of device features/factors may require an analysis in each device in order for that device to determine whether software applications are colluding. Yet, the precise combination of features/factors that require monitoring and analysis often can only be determined using information obtained from the specific computing device in which the activity or activities is/are performed and at the time the activity/activities is/are underway. For these and other reasons, existing solutions are not adequate for monitoring, detecting, and characterizing the collective behavior of, or the relationships between, a plurality of software applications in the computing device, in real-time, while the behavior is underway, and without consuming a significant amount of the computing device's processing, memory, or power resources.

Figure 8:
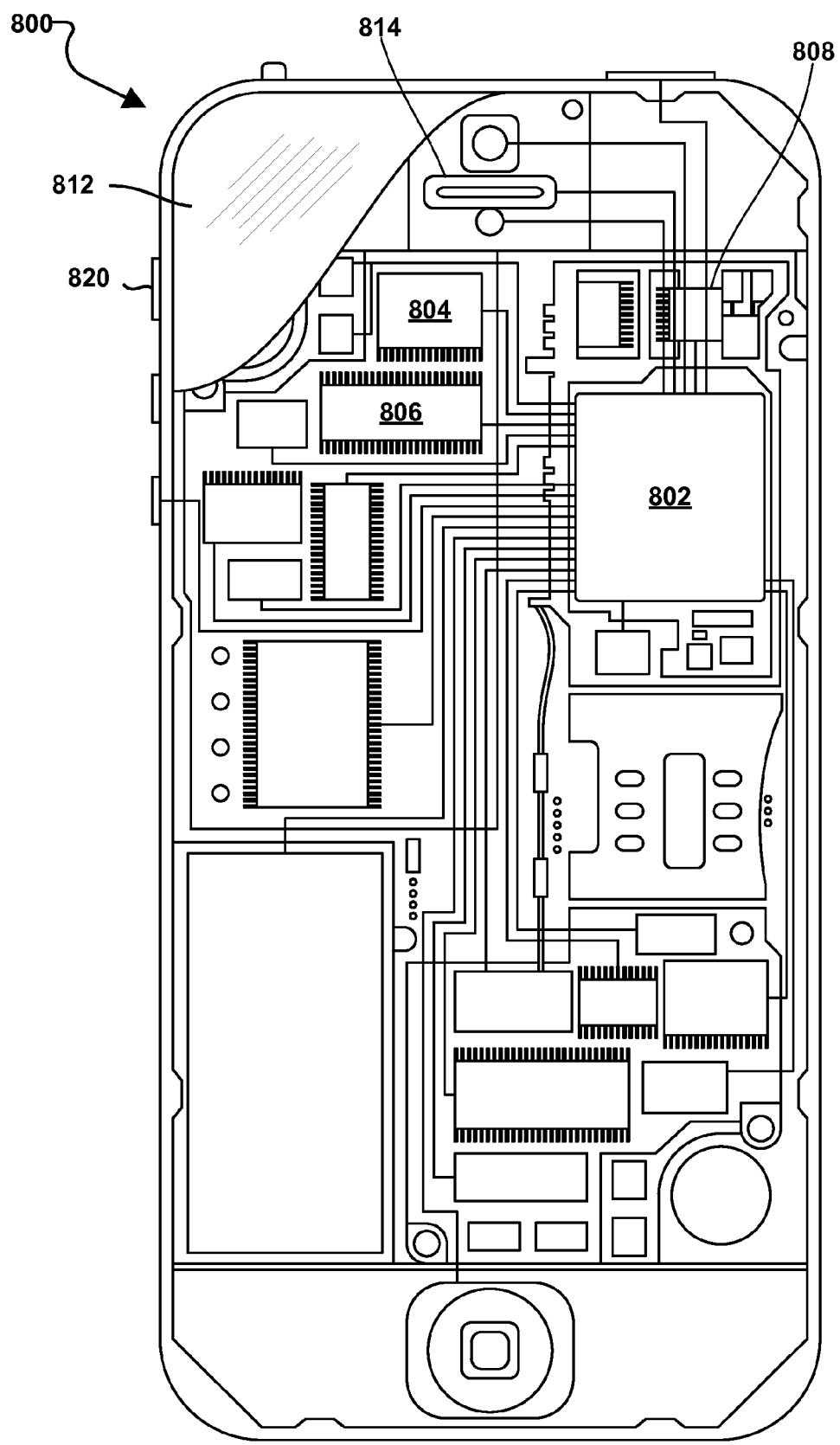
FIG. 8 is a component block diagram of a mobile device suitable for use in an aspect.

The various aspects, including the aspect discussed above with reference to FIGS. 2-7, may be implemented on a variety of computing devices configured with processor-executable instruction, an example of which is illustrated in FIG. 8 in the form of a smartphone. A smartphone 800 may include a processor 802 coupled to internal memory 804, a display 812, and to a speaker 814. Additionally, the smartphone 800 may include an antenna for sending and receiving electromagnetic radiation that may be connected to a wireless data link and/or cellular telephone transceiver 808 coupled to the processor 802. Smartphones 800 typically also include menu selection buttons or rocker switches 820 for receiving user inputs.

A typical smartphone 800 also includes a sound encoding/decoding (CODEC) circuit 806, which digitizes sound received from a microphone into data packets suitable for wireless transmission and decodes received sound data packets to generate analog signals that are provided to the speaker to generate sound. Also, one or more of the processor 802, wireless transceiver 808 and CODEC 806 may include a digital signal processor (DSP) circuit (not shown separately).

The processor 802 may be any programmable microprocessor, microcomputer or multiple processor chip or chips that can be configured by processor-executable instructions (applications) to perform a variety of functions and operations, including the operations of the various aspects described below. In some mobile devices, multiple processors 802 may be provided, such as one processor dedicated to wireless communication functions and one processor dedicated to running other applications. Typically, software applications may be stored in the internal memory 804 before they are accessed and loaded into the processor 802. The processor 802 may include internal memory sufficient to store the application software instructions. In various aspects, the processor 802 may be a device processor, processing core, or an SOC (such as the example SOC 100 illustrated in FIG. 1). In an aspect, the smartphone 800 may include an SOC, and the processor 802 may be one of the processors included in the SOC (such as one of the processors 102, 104, 106, 108, 110 illustrated in FIG. 1).

Various aspects may further include a computing device that includes means for comparing raw data received from a user input device to user interaction event information to generate analysis results, and means for using the generated analysis results to determine whether a user interaction (UI) event correlates with a user of the computing device. In some aspects, the means for comparing raw data received from the user input device to the user interaction event information to generate the analysis results may include means for comparing raw data received from a device driver to interaction information received from a high level operating system. In some aspects, the computing device may further include means for classifying an activity of a software application as non-benign in response to determining that the UI event does not correlate with a user of the computing device. In some aspects, the computing device may further include means for generating a behavior vector that characterizes an activity of a software application, means for applying the generated behavior vector to a classifier model that includes a decision node that evaluates whether there is a UI event that corresponds to the activity in response to determining that the UI event does not correlate with a user of the computing device, and means for using a result of applying the generated behavior vector to the classifier model to determine whether the activity of the software application is non-benign. In some aspects, the computing device may further include means for generating a behavior vector that characterizes an activity of a software application, means for selecting a classifier model that does not include a decision node that tests whether there is a UI event that corresponds to the activity in response to determining that the UI event does not correlate with a user of the computing device, means for applying the generated behavior vector to the selected classifier model to generate additional analysis results, and means for using the generated additional analysis results to determine whether the activity of the software application is non-benign. In some aspects, the computing device may further include means for selecting a family of robust classifier models in response to determining that the UI event does not correlate with a user of the computing device, and means for applying a plurality of behavior vectors to the selected family of robust classifier models to determine whether an activity of a software application is non-benign.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module which may be in the form of stored processor-executable software instruction store on a non-transitory computer-readable storage medium or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method, comprising:
   monitoring behaviors of a computing device to collect behavior information;
   generating a behavior vector information structure based on the collected behavior information;
   applying the behavior vector information structure to a classifier model to generate analysis results;
   using the analysis results to classify a behavior of the computing device;
   using the analysis results to determine features evaluated by the classifier model that contributed most to a classification of the behavior;
   selecting the features that contributed most to the classification of the behavior; and
   displaying the selected features on an electronic display of the computing device.

2. The method of claim 1, wherein using the analysis results to classify the behavior of the computing device comprises using the analysis results to classify the behavior as an anomaly.

3. The method of claim 1, wherein:
   using the analysis results to classify the behavior of the computing device comprises using the analysis results to classify the behavior as non-benign;
   using the analysis results to determine the features evaluated by the classifier model that contributed most to the classification of the behavior comprises using the analysis results to determine the features evaluated by the classifier model that contributed most to the classification of the behavior as non-benign; and
   selecting the features that contributed most to the classification of the behavior comprises selecting the features that contributed most to the classification of the behavior as non-benign.

4. The method of claim 1, wherein generating the behavior vector information structure based on the collected behavior information comprises generating a behavior vector that characterizes an activity of a software application.

5. The method of claim 1, further comprising:
   determining a relative importance of the features that contributed most to the classification of the behavior.

6. The method of claim 1, further comprising:
   balancing tradeoffs between amounts of computing device processing, memory, and energy resources used to identify, analyze or respond to the behavior based on the features that contributed most to the classification of the behavior.

7. The method of claim 1, wherein applying the behavior vector information structure to the classifier model to generate the analysis results comprises:
   selecting a family of robust classifier models; and
   applying a plurality of behavior vectors to the selected family of robust classifier models to generate the analysis results.

8. The method of claim 1, further comprising:
   receiving a full classifier model that includes a finite state machine, the finite state machine including information that is suitable for expression as a plurality of boosted decision stumps, each boosted decision stump including a test condition, a first weight value, and a second weight value;
   generating a list of boosted decision stumps by converting the finite state machine included in the full classifier model into the plurality of boosted decision stumps; and
   generating a lean classifier model in the computing device based on boosted decision stumps included in the list of boosted decision stumps,
   wherein applying the behavior vector information structure to the classifier model to generate the analysis results comprises applying the behavior vector information structure to the generated lean classifier model.

9. The method of claim 8, wherein applying the behavior vector information structure to the generated lean classifier model comprises:
   applying the collected behavior information included in the behavior vector information structure to each of the boosted decision stumps in the generated lean classifier model;
   using first weight values of the boosted decision stumps to compute a first weighted average of results of applying the collected behavior information to each of the boosted decision stumps in the generated lean classifier model; and
   comparing the first weighted average to a threshold value to determine whether the behavior is benign.

10. The method of claim 9, wherein selecting the features that contributed most to the classification of the behavior comprises using second weight values of the boosted decision stumps to determine the features that contributed most to the classification of the behavior as benign.

11. A computing device, comprising:
   a processor configured with processor-executable instructions to:
      monitor device behaviors to collect behavior information;
      generate a behavior vector information structure based on the collected behavior information;
      apply the behavior vector information structure to a classifier model to generate analysis results;
      use the analysis results to classify a behavior of the computing device;
      use the analysis results to determine features evaluated by the classifier model that contributed most to a classification of the behavior;
      select the features that contributed most to the classification of the behavior; and
      display the selected features on an electronic display of the computing device.

12. The computing device of claim 11, wherein the processor is further configured with processor-executable instructions to use the analysis results to classify the behavior of the computing device by using the analysis results to classify the behavior as an anomaly.

13. The computing device of claim 11, wherein the processor is further configured with processor-executable instructions to:
  use the analysis results to classify the behavior of the computing device by using the analysis results to classify the behavior as non-benign;
  use the analysis results to determine the features evaluated by the classifier model that contributed most to the classification of the behavior by using the analysis results to determine the features evaluated by the classifier model that contributed most to the classification of the behavior as non-benign; and
  select the features that contributed most to the classification of the behavior by selecting the features that contributed most to the classification of the behavior as non-benign.

14. The computing device of claim 11, wherein the processor is further configured with processor-executable instructions to:
  determine a relative importance of the features that contributed most to the classification of the behavior.

15. The computing device of claim 11, wherein the processor is further configured with processor-executable instructions to:
  balance tradeoffs between amounts of computing device processing, memory, and energy resources used to identify, analyze or respond to the behavior based on the features that contributed most to the classification of the behavior.

16. The computing device of claim 11, wherein:
  the processor is further configured with processor-executable instructions to:
    receive a full classifier model that includes a finite state machine, the finite state machine including information that is suitable for expression as a plurality of boosted decision stumps, each boosted decision stump including a test condition, a first weight value, and a second weight value;
    generate a list of boosted decision stumps by converting the finite state machine included in the full classifier model into the plurality of boosted decision stumps; and
    generate a lean classifier model in the computing device based on boosted decision stumps included in the list of boosted decision stumps, and
  the processor is further configured with processor-executable instructions to apply the behavior vector information structure to the classifier model to generate the analysis results by:
    applying the collected behavior information included in the behavior vector information structure to each of the boosted decision stumps in the generated lean classifier model;
    using first weight values of the boosted decision stumps to compute a first weighted average of results of applying the collected behavior information to each of the boosted decision stumps in the generated lean classifier model; and
    comparing the first weighted average to a threshold value to determine whether the behavior is benign.

17. The computing device of claim 16, wherein the processor is further configured with processor-executable instructions to select the features that contributed most to the classification of the behavior by using second weight values of the boosted decision stumps to determine the features that contributed most to the classification of the behavior as benign.

18. A non-transitory computer readable storage medium having stored thereon processor-executable software instructions configured to cause a processor of a computing device to perform operations comprising:
  monitoring device behaviors to collect behavior information;
  generating a behavior vector information structure based on the collected behavior information;
  applying the behavior vector information structure to a classifier model to generate analysis results;
  using the analysis results to classify a behavior of the computing device;
  using the analysis results to determine features evaluated by the classifier model that contributed most to a classification of the behavior;
  selecting the features that contributed most to the classification of the behavior; and
  displaying the selected features on an electronic display of the computing device.

19. The non-transitory computer readable storage medium of claim 18, wherein the stored processor-executable software instructions are configured to cause a processor to perform operations such that using the analysis results to classify the behavior of the computing device comprises using the analysis results to classify the behavior as an anomaly.

20. The non-transitory computer readable storage medium of claim 18, wherein the stored processor-executable software instructions are configured to cause a processor to perform operations such that:
  using the analysis results to classify the behavior of the computing device comprises using the analysis results to classify the behavior as non-benign;
  using the analysis results to determine the features evaluated by the classifier model that contributed most to the classification of the behavior comprises using the analysis results to determine the features evaluated by the classifier model that contributed most to the classification of the behavior as non-benign; and
  selecting the features that contributed most to the classification of the behavior comprises selecting the features that contributed most to the classification of the behavior as non-benign.

21. The non-transitory computer readable storage medium of claim 18, wherein the stored processor-executable software instructions are configured to cause a processor to perform operations further comprising:
  determining a relative importance of the features that contributed most to the classification of the behavior.

22. The non-transitory computer readable storage medium of claim 18, wherein the stored processor-executable software instructions are configured to cause a processor to perform operations further comprising:
  balancing tradeoffs between amounts of computing device processing, memory, and energy resources used to identify, analyze or respond to the behavior based on the features that contributed most to the classification of the behavior.

23. The non-transitory computer readable storage medium of claim 18, wherein:
  the stored processor-executable software instructions are configured to cause a processor to perform operations further comprising:
    receiving a full classifier model that includes a finite state machine, the finite state machine including information that is suitable for expression as a plurality of boosted decision stumps, each boosted decision stump including a test condition, a first weight value, and a second weight value;

generating a list of boosted decision stumps by converting the finite state machine included in the full classifier model into the plurality of boosted decision stumps; and generating a lean classifier model in the computing device based on boosted decision stumps included in the list of boosted decision stumps, and the stored processor-executable software instructions are configured to cause a processor to perform operations such that applying the behavior vector information structure to the classifier model to generate the analysis results comprises:

applying the collected behavior information included in the behavior vector information structure to each of the boosted decision stumps in the generated lean classifier model;

using first weight values of the boosted decision stumps to compute a first weighted average of results of applying the collected behavior information to each of the boosted decision stumps in the generated lean classifier model; and comparing the first weighted average to a threshold value to determine whether the behavior is benign.

24. The non-transitory computer readable storage medium of claim 23, wherein the stored processor-executable software instructions are configured to cause a processor to perform operations such that selecting the features that contributed most to the classification of the behavior comprises using second weight values of the boosted decision stumps to determine the features that contributed most to the classification of the behavior as benign.

25. A computing device, comprising:
means for monitoring device behaviors to collect behavior information;
means for generating a behavior vector information structure based on the collected behavior information;
means for applying the behavior vector information structure to a classifier model to generate analysis results;
means for using the analysis results to classify a behavior of the computing device;
means for using the analysis results to determine features evaluated by the classifier model that contributed most to a classification of the behavior;
means for selecting the features that contributed most to the classification of the behavior; and
means for displaying the selected features.

26. The computing device of claim 25, wherein means for using the analysis results to classify the behavior of the computing device comprises means for using the analysis results to classify the behavior as an anomaly.

27. The computing device of claim 25, wherein:
means for using the analysis results to classify the behavior of the computing device comprises means for using the analysis results to classify the behavior as non-benign;

means for using the analysis results to determine the features evaluated by the classifier model that contributed most to the classification of the behavior comprises means for using the analysis results to determine the features evaluated by the classifier model that contributed most to the classification of the behavior as non-benign; and means for selecting the features that contributed most to the classification of the behavior comprises means for selecting the features that contributed most to the classification of the behavior as non-benign.

28. The computing device of claim 25, further comprising:
means for determining a relative importance of the features that contributed most to the classification of the behavior.

29. The computing device of claim 25, further comprising:
means for receiving a full classifier model that includes a finite state machine, the finite state machine including information that is suitable for expression as a plurality of boosted decision stumps, each boosted decision stump including a test condition, a first weight value, and a second weight value;

means for generating a list of boosted decision stumps by converting the finite state machine included in the full classifier model into the plurality of boosted decision stumps; and means for generating a lean classifier model in the computing device based on boosted decision stumps included in the list of boosted decision stumps, wherein means for applying the behavior vector information structure to the classifier model to generate the analysis results comprises:

means for applying the collected behavior information included in the behavior vector information structure to each of the boosted decision stumps in the generated lean classifier model;

means for using first weight values of the boosted decision stumps to compute a first weighted average of results of applying the collected behavior information to each of the boosted decision stumps in the generated lean classifier model; and means for comparing the first weighted average to a threshold value to determine whether the behavior is benign.

30. The computing device of claim 29, wherein means for selecting the features that contributed most to the classification of the behavior comprises means for using second weight values of the boosted decision stumps to determine the features that contributed most to the classification of the behavior as benign.

* * * * *